United States Patent Office 3,529,291
Patented Sept. 15, 1970

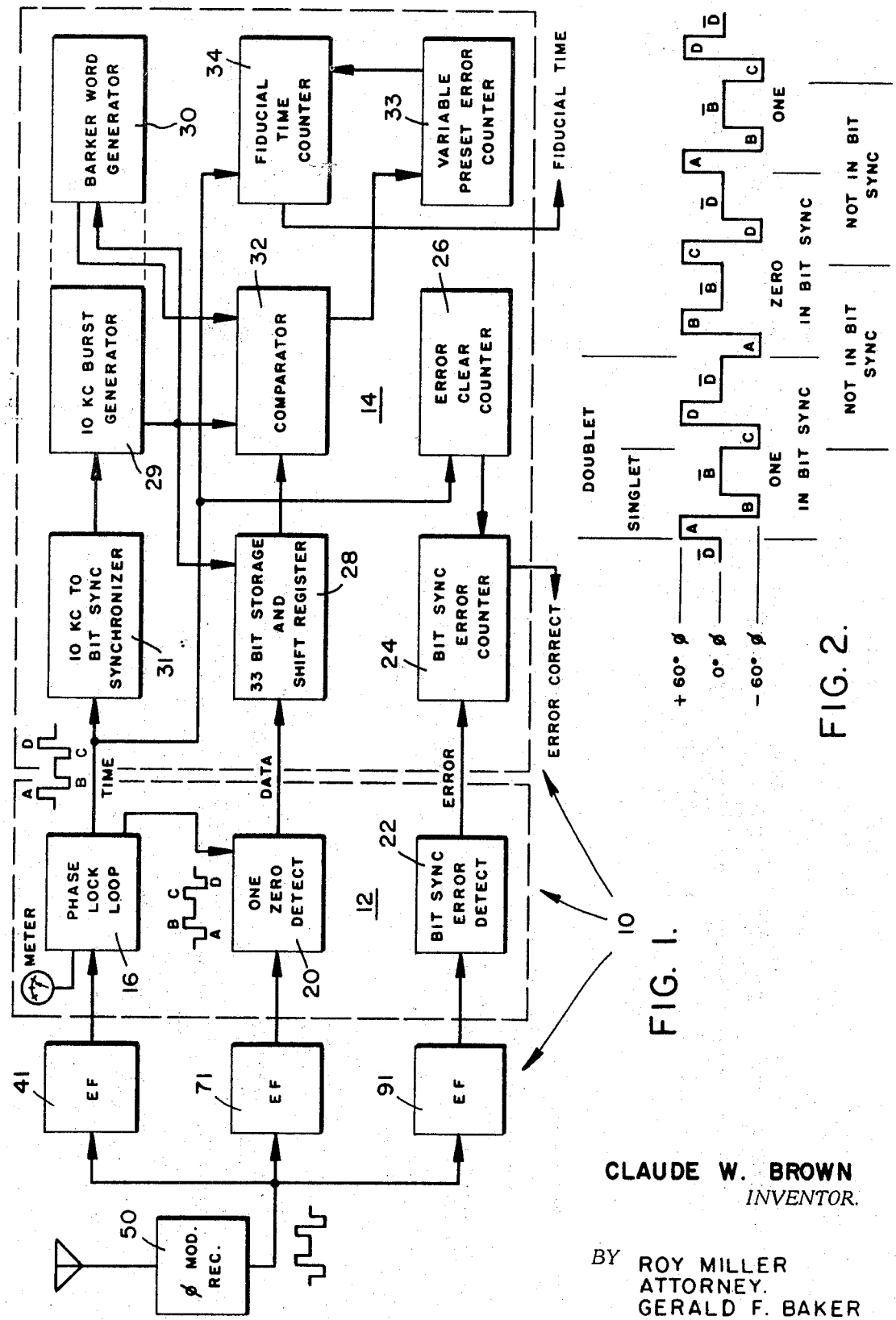

3,529,291
SYNCHRONIZED SEQUENCE DETECTOR
Claude W. Brown, China Lake, Calif., assignor to the United States of America as represented by the Secretary of the Navy
Filed Dec. 4, 1967, Ser. No. 687,813
Int. Cl. G06f 7/02
U.S. Cl. 340—146.2
2 Claims

ABSTRACT OF THE DISCLOSURE

A synchronized sequence generator uses a coded signal generator and detector network with a pulse storage and shift register to receive and temporarily store coded communication signals. A pulse pattern generator comprising a series of core-transistor logic elements and having an output consisting of a 33 bit pattern of ONE and Zero pulses is used to generate a comparison signal. The pattern, known as the Barker Word consists of an 11-bit phrase, the phrase repeated and the phrase complement. Bit Snyc Clock pulses related to the received signal are synchronized with pulses from a pulse burst generator which latter pulses are related to the comparison signal so that the received signal may be compared BIT by BIT with the comparison signal.

GOVERNMENT INTEREST

The invention described herein may be manufactured and used by or for the Government of the United States of America for governmental purposes without the payment of any royalties thereon or therefor.

CROSS REFERENCE TO RELATED APPLICATION

The Barker Word Generator according to the present invention has been included as one of the components of the Communication System Time Recovery Unit disclosed in patent application Ser. No. 679,060, filed Oct. 30, 1967 by Loran F. McCormick et al.

BACKGROUND OF THE INVENTION

Pseudo-random pattern generators for code communication have been developed and reference is made to Pat. No. 3,119,097 which discloses such a generator which is capable of generating numerous coded "words." (Its capabilities, however do not include generation of the "Barker Word.")

Communications systems generally are designed to operate reliably under given conditions and in the application of McCormick et al., the system is designed for reliable operation under conditions in which the signal to noise ratio is as low as −12 db in a 3 kc. bandwidth.

The Barker Word output of the present generator has been found to be exceptionally well adapted for the achievement of code correlation under conditions of low signal to noise ratio and the generator of the present invention accurately and reliably achieves the Barker Word output with a low power requirement in a unit of small physical size.

SUMMARY OF THE INVENTION

The Barker Word generator comprises a series of magnetic logic cores such as may be obtained commercially as a core-transistor logic unit (CTL) as illustrated in "The Application of Magnetic Core Logic to Digital-Data Manipulation" by DI/AN Controls, Inc. brochure number 12–851 dated March 1960. These cores are arranged to make up a pseudo-random pattern generator, the output of which is the 33-bit Barker Word.

How the various cores are connected for the intended purpose will be better understood from the following detailed description taken together with the accompanying drawing.

BRIEF DESCRIPTION OF THE SEVERAL VIEWS OF THE DRAWING

FIG. 1 is a simplified block diagram of a communications system utilizing a Barker Word generator according to the present invention;

FIG. 2 is a waveform diagram of a typical input to the system of FIG. 1;

DETAILED DESCRIPTION

As shown in FIG. 1, the Barker Word generator 30 is a component of a Communications system comprising a phase modulated receiver 50 and a Time Recovery Unit 10. The Time Recovery Unit 10 consists of an Analog Section 12 and a Digital Section 14.

The function of the Time Recovery Unit is that of issuing an output pulse a specific length of time after a coded signal (FIG. 2) has been received from a remote station (e.g. signals sent from or reflected by a satellite). The unit decodes the signal, identifies and separates it from other data being transmitted, establies the proper time between identification and issuance of the pulse, and then issues the pulse referred to as a fiducial time pulse.

The analog section is inputted through the emitter followers 41, 71, 91 to isolate the inputs from each other and to match the impedance of the inputs to downstream circuitry. The Analog Section comprises; a phase Lock Loop 16 which produce gating signals and synchronizes the gating signals to the input signal; a ONE:ZERO Detector 20 for decoding the input signal and converting the coded information into AND and ZERO binary bits for the Digital Section; and a Bit Sync Error Detector to provide error signals when the system is not IN BIT SYNC.

The ANALOG SECTION is more fully described in the above-mentioned application Ser. No. 679,060, filed Oct. 30, 1967.

DIGITAL SECTION

Figure 3:
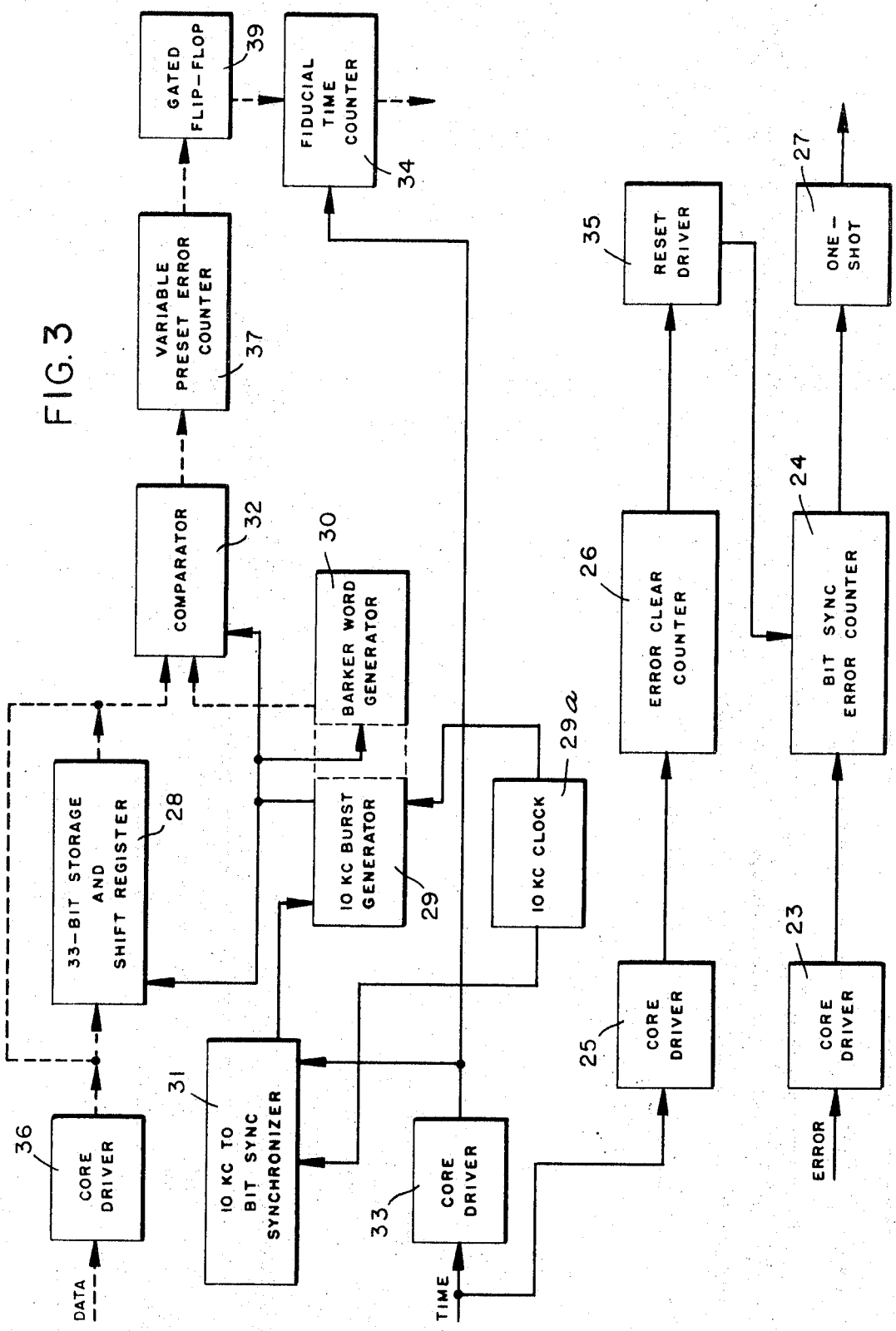
FIG. 3 is a block diagram of the Digital Section of the system of FIG. 1.

There are three inputs to the Digital Section DATA, ERROR and TIME: Data, decoded counts from the ONE:ZERO Detector 20: Error, BIT SYNC ERROR pulses from the BIT SYNC Error Detector 22; and Time, BIT SYNC CLOCK pulses from a voltage controlled oscillator in Phase Lock Loop 12. Data pulses are applied to the input of the 33-Bit Storage and Shift Register 28; Error pulses are applied to the input of the BIT SYNC Error Counter 24; and Time pulses are applied to the inputs of the BIT SYNC Error Clear Counter 26, the Snychronizer 31 for the 10 kc. Burst Generator 29, and the Fiducial Time Counter 34. FIG. 3 is a simplified block diagram of the Digital Section and FIGS. 4 and 5 constitute a logic diagram of the Digital Section.

BARKER WORD GENERATOR

The Barker Word Generator 30 is a pseudo-random pattern generator whose output is the Barker Word. The Barker Word is a 33-bit pattern of ONE and ZERO pulses. The pattern is:

111000100101110001001000011101101 and is made up of three parts. Each part is an 11-bit phrase (11100010010) or its complement (00011101101)

The Barker Word consists of the phrase, the phrase repeated, and the complement. Thus, the Barker Word may be stated as BW, BW, $\overline{BW}$.

The 33-bit pattern is generated at a 10 kc. rate each time a BIT SYNC CLOCK pulse arrives from the VCO. The generation of the Barker Word at a 10 kc. rate also provides a 10 kc. output for other purposes.

The BW, BW, BW output of the Barker Word Generator is fed to the input of the Comparator 32.

10 kc. to BIT SYNC Synchronizer

The 10 kc. output of the clock 29a (FIG. 3) and the BIT SYNC CLOCK pulses from the VCO 44 are both applied to the synchronizer 31. The synchronizer outputs a 10 kc. wave that is synchronized with the BIT SYNC CLOCK pulses. That is, the leading edge of each synchronized BIT SYNC CLOCK pulse will occur simultaneously with the leading edge of a 10 kc. pulse. This ensures complete synchronization between internal and external clocks.

33-Bit Storage and Shift Register

Input to the 33-Bit Storage and Shift Register 28 is from the output of the ONE:ZERO Detector 20 applied through a core-driver 36. Shift drive to the register 28 is applied through a core-driver AA (FIG. 4) from the output of the 10 kc. Burst Generator, 29.

The 10 kc. output of the 10 kc. Burst Generator 29, which is derived from the thirty-four 10 kc. square-wave pulses produced by the Barker Word Generator 30, shifts the register 28 a total of 34 times. Each time the register is shifted, the bit in the last stage is shifted out to the input of the Comparator 32 and is rung-around to the first stage of the register 28. On the next-to-last shift (the 33rd), all the bits are in their original positions, with the exception of the 33rd bit. The input to the last stage of the register is inhibited on the next-to-last shift, leaving the stage in its ZERO condition. When, on the last shift (the 34th), all the bits are shifted one stage, the ZERO from the last stage is rung around to the first stage, leaving the first stage in its ZERO condition. The ZERO output does not affect the Comparator.

This process has advanced the 33 bits in storage one stage and has eliminated the last (33rd) bit, leaving 32 bits in the register and leaving the first stage ready for the next bit from the ONE:ZERO Detector. If the next bit is a ONE, the first stage will be set to its ONE condition. If the next bit is a ZERO, the stage will remain in its ZERO condition (a ZERO input is identical to no input at all). The new bit (data input) occurs midway between BIT SYNC CLOCK (time input) pulses and, since the synchronizer ensures that the first 10 kc. pulse occurs simultaneously with the leading edge of the synchronized BIT SYNC CLOCK pulse, there is more than ample time for the generation of the thirty-four 10 kc. pulses to shift the entire register.

Comparator

Figure 4:
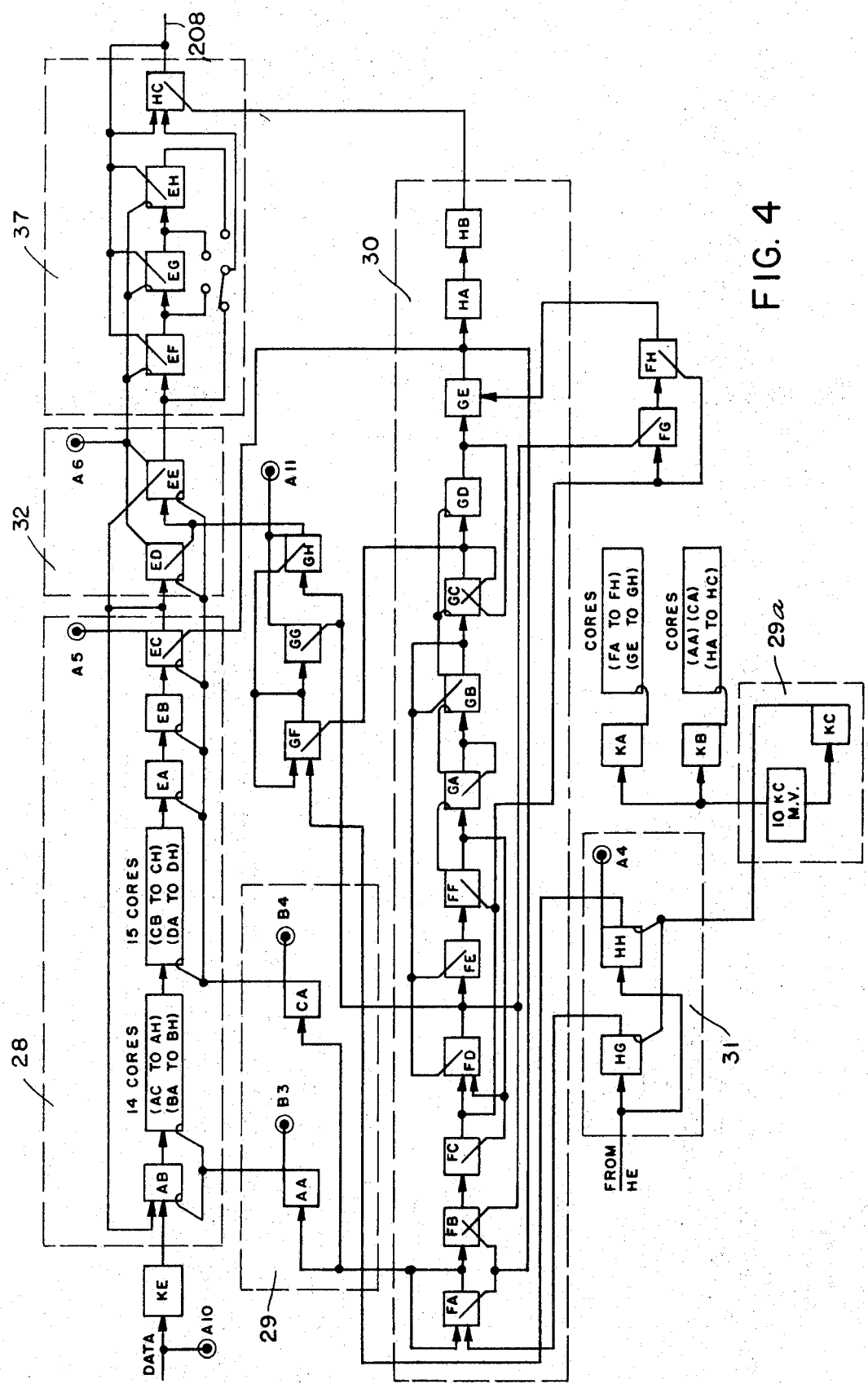
FIGS. 4 and 5 constitute a logic diagram of the Digital Section.
Figure 5:
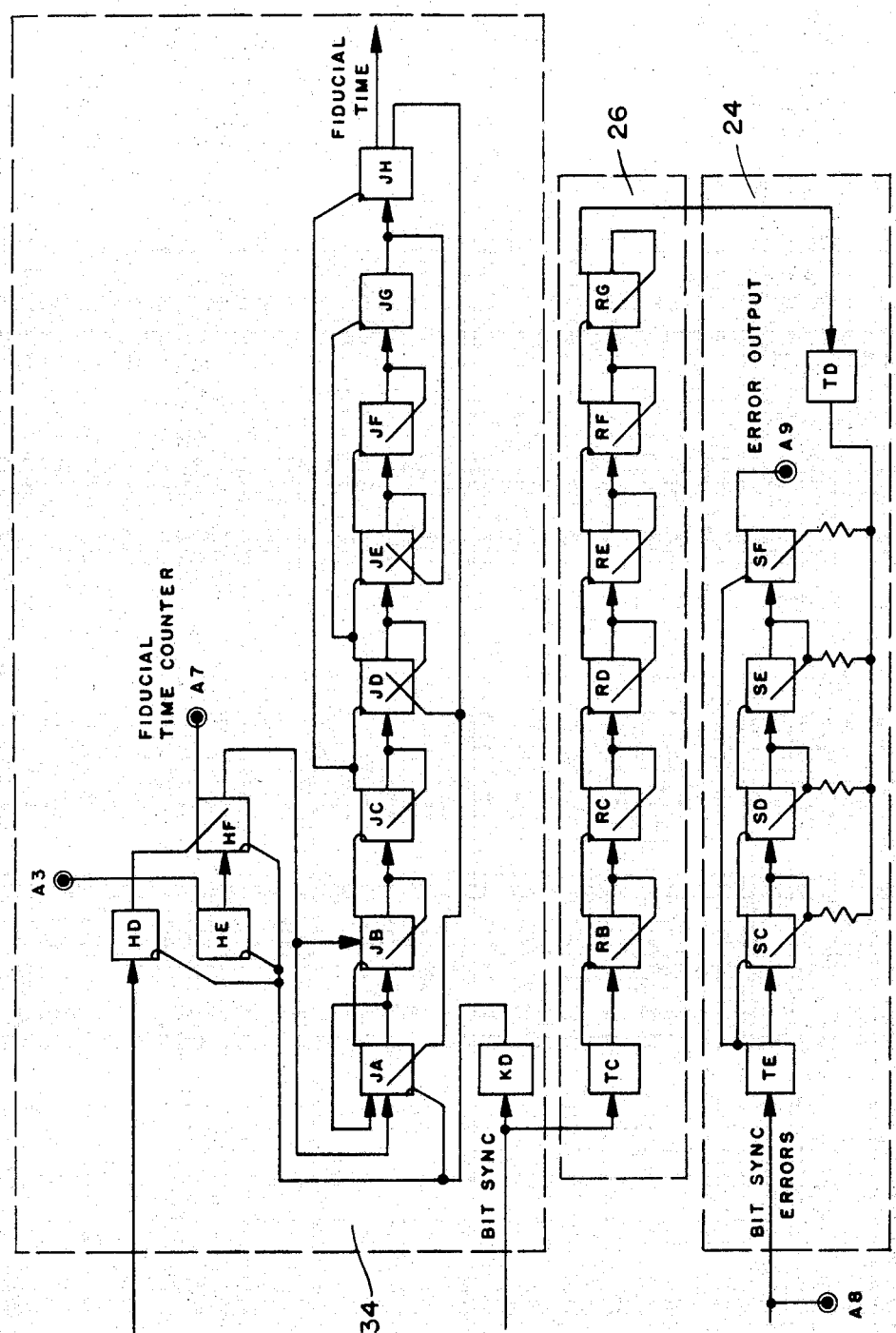

The Comparator 32 is an EXCLUSIVE OR gate consisting of two magnetic logic cores, ED-EE (FIG. 4). An EXCLUSIVE OR gate has an output only when both inputs to the gate are dissimilar. Refer to Table 1 for the Truth of this circuit.

TABLE 1.—TRUTH TABLE-COMPARATOR

| Input from 33-Bit Register | Input from Barker Word Generator | Output from Comparator |
|---|---|---|
| ONE | ZERO | ONE |
| ZERO | ONE | ONE |
| ONE | ONE | ZERO |
| ZERO | ZERO | ZERO |

Thus, only when the Barker Word is present in its entirety in the register 28, will there be no output from the Comparator 32. If, at any time, the Barker Word is not entirely present without error in the register, there will be, at some time during the scanning, output from the Comparator. Table 2 illustrates this. The Comparator 32 compares the output of the Barker Word Generator 30 to the output of the register 28 bit-by-bit.

The output of the Comparator 32 is applied to the input of the Variable Preset Error Counter 33.

TABLE 2

Comparison results (A) is the input from the 33-Bit Storage and Shift Register
(B) is the input from the Barker Word Generator
(C) is the output of the Comparator Example 1: One bit time before Barker Word is in the Register—

(A) 01101110000100100011101001000 1110
(B) 10110111000010010001110100100 0111
(C) 11011001000110110010011101100 1001=17 errorr (output) pulses Example 2: Barker Word is in the register—

(A) 10110111000010010001110100100 0111
(B) 10110111000010010001110100100 0111
(C) 00000000000000000000000000000 0000=no error (output) pulses Example 3: One bit time after Barker Word is in the register—

(A) 11011011100001001000111010010 0011
(B) 10110111000010010001110100100 0111
(C) 01101100100001101100100111011 00100=16 error (output) pulses

Variable Preset Error Counter

The Variable Preset Error Counter 33 is a switch-controlled shift register to the base three. However, the counter may be adjusted to produce an output pulse after 1, 2, 3, or 4 counts.

The magnetic logic core circuit is shifted by the undelayed output of the Comparator while input to the circuit is from the delayed output of the Comparator. Input is always made to the first stage (core EF, FIG. 4).

The switch 37 is adjustable to select the output of the Comparator directly (0), or the output of the first (1), second (2), or third (3) counter stages. Whichever the switch selects, that output is connected to a gated flip-flop HC. Any input to the gated flip-flop will cause output from it at 10 kc. rate until it is inhibited. This occurs before the next BIT SYNC CLOCK pulse. The output of the flip-flop is connected to the Fiducial Time Counter 34.

FIDUCIAL TIME COUNTER

Input to the Fiducial Time Counter 34 is from core HE, a "ONE" generator. Core HE generates a ONE each time a BIT SYNC CLOCK pulse arrives. The Fiducial Time Counter produces an output after 43 such pulses have been generated. The counter is a simple binary counter to the base 43.

The output of the Variable Preset Error Counter 33, core HC, when triggered as described above, inputs core HD at a 10 kc. rate. This causes the input to the Fiducial Time Counter, core HF, to be inhibited, stopping the input of ONE pulses from the ONE generator HE. This prevents any input to the start of the Fiducial Time Counter, core JA. Thus, when there is an output from the Variable Preset Error Counter 33, the input to the Fiducial Time Counter 34 is inhibited.

When there are no errors detected, or the number of errors are within the allowable selected limits, the output of the ONE generator HE is not inhibited and a ONE is applied to the Fiducial Time Counter 34 with each BIT SYNC CLOCK pulse. The output of the counter occurs at the 43rd BIT SYNC CLOCK pulse from its start but, because of other circuit delays, this is effectively 45 BIT SYNC CLOCK pulses from the end of the Barker Word. Since the Barker Word is located 45 BIT SYNC pulses before Fiducial Time, it is necessary to count up the BIT SYNC pulses after detection of the Barker Word to output the Fiducial Time pulse at the correct reference time.

The output Fiducial Time Pulse is a single 1 μs., −10 v. pulse.

DETAILED CIRCUIT ANALYSIS

There now follows a detailed description of the operation of the system.

Barker Word Generator

The Barker Word Generator 30, like all the circuits in the Digital Section 14, is composed of a series of magnetic logic cores. Cores FA through FH and GA through GH (refer to FIGS. 4 and 5) make up a pseudo-random pattern generator, the output, core GH, being the 33-bit Barker Word. Every time a BIT SYNC CLOCK pulse occurs at core KD (which gives an output on negative going edge), cores HG and HH are inputted from the ONE generator, core HE. When the next 10 kc. pulse from core KC occurs, cores FA and GF will be inputted. These two cores FA and GF are wired as a flip-flop and will give an output every time a 10 kc. shift pulse occurs, until inhibited. The shift pulses for these two cores occur 180 degrees out-of-phase with cores HG and HH, thus, no interference can occur when cores FA and GF are inputted and shifted.

The output of core GB is a pulse occurring once for every 11 pulses of flip-flop core FA; the output of core GC is one pulse for every 22 pulses of flip-flop core FA; the output of core GD is one pulse for every 33 pulses of flip-flop core FA; and the output of core GE is one pulse for every 34 pulses of flip-flop core FA. The output of core GE inhibits core FA causing the flip-flop to stop after a count of 34 pulses and also inhibits core EC in the 33-Bit Storage and Shift Register 28.

The output of core FD is the complement of the 11-bit Barker Word (00011101101) and is repeated three times. This output is inputted into core GH and inhibits core GG. It will be noted here that core GF is a flip-flop that started at the same time as core FA and is turned off at the 22nd pulse of core FA by core GC, therefore, flip-flop core GF is on for twenty-two 10 kc. pulses.

Cores GG and GH form an EXCLUSIVE OR function, an output at core GH occurring only when the two pulses from cores GF and FD are not ONES or ZEROS simultaneously. Since core GF has a continuous output for 22 pulses, the output of core GH will be the complement of core FD for 22 pulses and will be the same as core FD for the remaining eleven bits, giving the output at core GH of the 33-bit Barker Word (BW, BW, $\overline{BW}$) (111000100101110001001000011101101). This complete cycle of generation of the 33-bit Barker Word occurs at a 10 kc. rate and is repeated every time a BIT SYNC CLOCK PULSE occurs.

It will be noted that flip-flop core FA also inputs cores AA and CA. These two cores are used to shift the 33-Bit Storage and Shift Register and together they form the 34-Bit 10 kc. Burst Generator 29 in conjunction with core FA.

10 kc. to BIT SYNC Synchronizer

The 10 kc. to BIT SYNC Synchronizer 31 is made up of cores HG and HH. When a BIT SYNC CLOCK pulse is applied to core KD, ONE generator HE is shifted and puts out a pulse. This pulse is applied to the inputs of cores HG and HH, among others. Cores HG and HH are continuously being shifted by the output of core KC which is a core driver driven by the output of the 10 kc. multivibrator 29. As soon as there is something in cores HG to HH to be shifted out (the BIT SYNC CLOCK pulse), the output of KC shifts that bit out. This is connected as the input to FA and GF which are wired as a flip-flop. Each other 10 kc. pulse, applied directly to KA and KB, causes the Barker Word Generator 30 and the 33-Bit Storage and Shift Register 28 to function. The effect of HG and HH is, therefore, to pass first 10 kc. pulse after each BIT SYNC CLOCK, pulse so as to synchronize the 10 kc. pulses to the BIT SYNC CLOCK pulses.

33-Bit Storage and Shift Register

Each data bit will precede the BIT SYNC CLOCK pulse by approximately 5 milliseconds, depending on which satellite is tracked. This data bit is shaped by core KE, which gives an output on the negative going edge, the inputted into core AB. The BIT SYNC CLOCK pulse then starts the Barker Word Generator 30 at a 10 kc. rate. This also starts core shift drivers AA and CA at a 10 kc. rate. The 33-Bit Storage and Shift Register 28 is shifted 34 times. The purpose of these 34 shift pulses is to input each bit serially into core ED of the Comparator and to shift each bit back into the register.

When 33 shift pulses occur, each bit is in the same location as it started, with the exception of core EC. On the 33rd shift pulse, the incoming bit to core EC is inhibited, leaving the core in its ZERO state. On the 34th shift pulse, each bit is shifted one more core, leaving core AB now in its ZERO state. The cycle is continuously repeated each time a BIT SYNC CLOCK pulse occurs.

It will be noted here that the shift pulses from the cores AA and CA are delayed by one shift pulse. This is to compensate for delays of the Barker Word so that the Barker Word will reach the Comparator circuit 32 at the same time as the data from the 33-Bit storage and Shift Register 28.

Comparator

The comparator 32 forms what is known logically as an EXCLUSIVE OR circuit. If both inputs to the Comparator 32, cores ED and EE, are either ZEROS or ONES there will be no output. See Comparator Truth Table, Table 2. Only when the inputs do not compare, will there be an output of the Comparator 32. Therefore, when the Barker Word from the Barker Word Generator 30 is compared against the 33 bits in the storage register 28 and the 33 bits in the storage register is the Barker Word from the satellite, there will be no output from the Comparator 32.

Variable Preset Error Counter

The Variable Preset Error Counter 33 is controlled by ERROR switch SW2.

The undelayed output of the Comparator 32 is used to shift error detect cores EF, EG, and EH. Whenever the Comparator 32 does not compare, the undelayed output will shift these three cores. The current is then delayed through core EE and inputted into cores EF and HC, providing switch SW2 is in the 0 error position.

Once core HC has an input, it will continue to have an output due to the flip-flop action of this core, at a 10 kc. rate, as long as it is not inhibited. The output is fed to the input of core HD and to the inhibit windings of cores EF, EG, and EH. This inhibit of cores EF, EG, and EH is used as a means of clearing these cores. As long as core HC is outputting, it will continually shift out cores EF, EG, and EH. This is to make sure that these cores are cleared before another BIT SYNC CLOCK pulse occurs.

Core HC continually inputs core HD at a 10 kc. rate, once an error occurs. In order to stop core HC after the comparing cycle is completed, core HC is inhibited by core HB. The output of core HB is a pulse occurring at the 36th, 10 kc. pulse after core FA is started. Since core FA is turned off on the 34th pulse, the comparing cycle has been completed but core HC is left on till cores EF, EG, and EH are cleared.

Since core HD is shifted at the BIT SYNC CLOCK rate, there is no interference between the output of core HC, thus, the input of core HD and the shifting of core HD.

When one error occurs in the data Barker Word, the output of the Comparator 32 will have one error. If switch SW2 is in the 1 error position, the undelayed current out of the Comparator 32 will shift cores EF, EG, and EH (there should be nothing in them at this time because they were previously cleared), and the delayed current will be inputted into core EF. Since there are no more errors, the Comparator 32 will not give out any further shift pulses and core HC will not be inputted because the error in core EF will not be shifted into core HC. Therefore, one error has been detected.

If there are three errors in the data Barker Word, the output of the Comparator 32 will show these three errors. Switch SW2 is now in the 3 error position. Each time an error occurs at the output of the Comparator 32 it shifts the first error into core EF, the second error into core EG, and the third error into core EH. Since there are no more errors in the data Barker Word, there will be no more shift outputs of the Comparator 32. Since switch SW2 is in the 3 error position, there will not be any output of core EH and again core HC will not be inputted.

If switch SW2 was in the 2 error position and had these three errors occurred, the same time the third error was going into core EH, flip-flop core HC would have been inputted. Therefore, recognition of the data Barker Word would not have been accomplished.

Fiducial Time Counter

It was noted previously that when BIT SYNC occurs, the complete comparison cycle is started and, if any errors had occurred due to the data Barker Word not being in the 33-Bit Storage and Shift Register, there would be errors occurring at the output of core HC. Since core HC feeds core HD at a 10 kc. rate, the cycle is completed before another BIT SYNC CLOCK pulse occurs. Anytime an error is present, core HD will be inputted. On the next BIT SYNC CLOCK pulse, the output of core HD is shifted into the inhibit of core HF, inhibiting the ONE coming from the ONE generator, core HE. On the next BIT SYNC CLOCK pulse, since core HF is in the ZERO state, there will not be an input itno core JA, the start of the Fiducial Time Counter 34.

When the Barker Word is in the 33-Bit Storage and Shift Register 28 and comparison is made, recognition is assumed. Core HC is not inputted and core HD is not inputted. On the next BIT SYNC CLOCK pulse after recognition, the ONE generator, core HE, will input core HF because core HD will not have an output and not inhibit core HF. On the second BIT SYNC CLOCK pulse after recognition, the output of core HF will input flip-flop core JA, starting the Fiducial Time Counter 34. The Fiducial Time Counter 34 then counts the BIT SYNC pulses until the correct time count is present at core JH. The output of core JH is the Fiducial Time Pulse, which also stops the Fiducial Time Counter 34 by inhibiting cores JA and JD.

The output of core HF also inputs core JB. This is to present a count into the counter so the counter will output fiducial time at the correct time.

What is claimed is:
1. A synchronized signal generator and detector network comprising:
   pulse storage and shift register means, including means for receiving and temporarily storing a coded communication signal;
   a pulse pattern generator for generating a comparison signal identical to the communication signal to be detected;
   a source of BIT SYNC CLOCK pulses related to said communication signal;
   said pulse pattern generator including pulse burst generator means;
   synchronization means connected to said source of BIT SYNC CLOCK pulses and to said pulse burst generator means for synchronizing the production of said comparison signal in timed relationship with the acquisition of said coded communication signal;
   signal comparison means connected to receive said coded signal from said shift register means, to receive a comparison signal from said pattern generator, and to receive synchronized time pulses from said burst generator; and
   said signal comparison means being operative to make a BIT by BIT comparison of said communication signal with said comparison signal.
2. The network of claim 1 in which said pulse pattern generator comprises a series of core-transistor logic elements with an output consisting of a 33 bit pattern of ONE and ZERO pulses constituting the Barker Word.

References Cited
UNITED STATES PATENTS

| | | | |
|---|---|---|---|
| 2,986,723 | 5/1961 | Darwin et al. | 340—146.2 X |
| 3,439,335 | 4/1969 | Slayton | 340—146.2 |
| 3,119,097 | 1/1964 | Tullos | 340—168 |

EUGENE G. BOTZ, Primary Examiner

D. H. MALZAHN, Assistant Examiner

U.S. Cl. X.R.

340—149